US010027760B2

(12) United States Patent
Renzullo et al.

(10) Patent No.: US 10,027,760 B2
(45) Date of Patent: Jul. 17, 2018

(54) METHODS, SYSTEMS, AND COMPUTER READABLE MEDIA FOR SHORT AND LONG TERM POLICY AND CHARGING RULES FUNCTION (PCRF) LOAD BALANCING

(71) Applicant: Oracle International Corporation, Redwood Shores, CA (US)

(72) Inventors: Jared Michael Renzullo, Hudson, MA (US); Tarek Abou-Assali, Wellesley, MA (US); Matthew James Buehler, Blackstone, MA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 14/720,412

(22) Filed: May 22, 2015

(65) Prior Publication Data

US 2016/0344817 A1    Nov. 24, 2016

(51) Int. Cl.
*H04L 29/08* (2006.01)
*H04L 12/24* (2006.01)
(Continued)

(52) U.S. Cl.
CPC ............ *H04L 67/14* (2013.01); *H04L 41/042* (2013.01); *H04L 41/0893* (2013.01); *H04L 43/0817* (2013.01); *H04L 12/1407* (2013.01)

(58) Field of Classification Search
CPC ... H04L 67/14; H04L 41/0893; H04L 41/042; H04L 43/0817; H04L 12/1407
See application file for complete search history.

(56) References Cited

U.S. PATENT DOCUMENTS 6,560,717 B1 * 5/2003 Scott ...................... G06F 9/505
                                                            714/4.1
6,795,546 B2   9/2004 Delaney et al.
(Continued)

FOREIGN PATENT DOCUMENTS

CA    2 716 544 A1    12/2010
CN    101150512 A     3/2008
(Continued)

OTHER PUBLICATIONS

Communication of European publication number and information on the application of Article 67(3) EPC for European Application No. 14812837.4 (dated Sep. 7, 2016).
(Continued)

*Primary Examiner* — Brian J Gillis
*Assistant Examiner* — Steve Lin
(74) *Attorney, Agent, or Firm* — Jenkins, Wilson, Taylor & Hunt, P.A.

(57) ABSTRACT

A method for assigning new Diameter sessions to policy and charging rules functions (PCRFs) may be performed at a Diameter routing agent including at least one processor. The method includes receiving input regarding central processing unit (CPU) and session utilization of each of a plurality of PCRFs. The method further includes receiving Diameter message traffic requiring processing by one of the PCRFs. The method further includes identifying, from the Diameter message traffic, traffic for new sessions that have not been assigned to one of the PCRFs. The method further includes assigning the new sessions to the PCRFs based on the input regarding the CPU and session utilizations of the PCRFs. The method further includes routing the received Diameter message traffic for the new sessions to the PCRFs assigned to the new sessions.

18 Claims, 6 Drawing Sheets

(51) Int. Cl.
*H04L 12/26* (2006.01)
*H04L 12/14* (2006.01)

(56) References Cited

U.S. PATENT DOCUMENTS

| | | | |
|---|---|---|---|
| 6,967,956 | B1 | 11/2005 | Tinsley et al. |
| 7,043,000 | B2 | 5/2006 | Delaney et al. |
| 7,079,499 | B1 | 7/2006 | Akhtar et al. |
| 7,286,516 | B2 | 10/2007 | Delaney et al. |
| 7,298,725 | B2 | 11/2007 | Rune |
| 7,383,298 | B2 | 6/2008 | Palmer et al. |
| 7,403,537 | B2 | 7/2008 | Allison et al. |
| 7,466,807 | B2 | 12/2008 | McCann et al. |
| 7,522,517 | B1 | 4/2009 | Johnson |
| 7,590,732 | B2 | 9/2009 | Rune |
| 7,633,872 | B2 | 12/2009 | Pitcher et al. |
| 7,633,969 | B2 | 12/2009 | Caugherty et al. |
| 7,706,343 | B2 | 4/2010 | Delaney et al. |
| 7,892,991 | B2 | 2/2011 | Yamanaka et al. |
| 7,916,685 | B2 | 3/2011 | Schaedler et al. |
| 7,961,685 | B2 | 6/2011 | Suh et al. |
| 7,996,007 | B2 | 8/2011 | Bantukul |
| 7,996,541 | B2 | 8/2011 | Marathe et al. |
| 8,045,983 | B2 | 10/2011 | Bantukul |
| 8,468,267 | B2 | 6/2013 | Yigang et al. |
| 8,566,474 | B2 | 10/2013 | Kanode et al. |
| 8,601,073 | B2 | 12/2013 | Craig et al. |
| 8,613,073 | B2 | 12/2013 | McCann et al. |
| 9,106,769 | B2 | 8/2015 | Kanode et al. |
| 9,240,949 | B2 | 1/2016 | McMurry et al. |
| 9,369,386 | B2 | 6/2016 | McMurry et al. |
| 9,391,897 | B2 | 7/2016 | Sparks et al. |
| 9,420,607 | B1* | 8/2016 | Jain ...................... H04W 76/027 |
| 9,450,872 | B2 | 9/2016 | Campbell et al. |
| 9,537,775 | B2 | 1/2017 | McMurry et al. |
| 9,699,045 | B2 | 7/2017 | Roach et al. |
| 2002/0133534 | A1 | 9/2002 | Forslow |
| 2003/0200277 | A1 | 10/2003 | Kim |
| 2005/0105464 | A1 | 5/2005 | Acharya et al. |
| 2006/0069776 | A1 | 3/2006 | Shim et al. |
| 2006/0090004 | A1 | 4/2006 | Nikolayev et al. |
| 2006/0268835 | A1 | 11/2006 | Hyotylainen et al. |
| 2007/0083927 | A1 | 4/2007 | Swaroop |
| 2007/0121596 | A1 | 5/2007 | Kurapati et al. |
| 2007/0153995 | A1 | 7/2007 | Fang et al. |
| 2008/0031258 | A1 | 2/2008 | Acharya et al. |
| 2008/0043614 | A1 | 2/2008 | Soliman |
| 2008/0144602 | A1 | 6/2008 | Casey |
| 2008/0170497 | A1 | 7/2008 | Jeong et al. |
| 2008/0198747 | A1 | 8/2008 | Gilfix et al. |
| 2008/0250156 | A1 | 10/2008 | Agarwal et al. |
| 2008/0253387 | A1 | 10/2008 | Liang et al. |
| 2009/0083861 | A1 | 3/2009 | Jones |
| 2009/0092131 | A1 | 4/2009 | Hu et al. |
| 2009/0185494 | A1 | 7/2009 | Li et al. |
| 2009/0265467 | A1 | 10/2009 | Peles |
| 2010/0030914 | A1 | 2/2010 | Sparks et al. |
| 2010/0211956 | A1 | 8/2010 | Gopisetty et al. |
| 2010/0299451 | A1 | 11/2010 | Yigang et al. |
| 2011/0040845 | A1 | 2/2011 | Cai et al. |
| 2011/0061061 | A1 | 3/2011 | Chen et al. |
| 2011/0090900 | A1 | 4/2011 | Jackson et al. |
| 2011/0171958 | A1 | 7/2011 | Hua et al. |
| 2011/0202676 | A1 | 8/2011 | Craig et al. |
| 2011/0283016 | A1* | 11/2011 | Uchida ................ G06F 9/505 709/235 |
| 2011/0299395 | A1 | 12/2011 | Mariblanca Nieves |
| 2012/0044867 | A1 | 2/2012 | Faccin et al. |
| 2012/0087368 | A1 | 4/2012 | Kunarathnam et al. |
| 2012/0131165 | A1 | 5/2012 | Baniel et al. |
| 2012/0155389 | A1 | 6/2012 | McNamee et al. |
| 2012/0203781 | A1 | 8/2012 | Wakefield |
| 2012/0221445 | A1 | 8/2012 | Sharma |
| 2012/0221693 | A1 | 8/2012 | Cutler et al. |
| 2012/0303796 | A1 | 11/2012 | Mo et al. |
| 2012/0303835 | A1 | 11/2012 | Kempf et al. |
| 2012/0307631 | A1 | 12/2012 | Yang et al. |
| 2013/0124712 | A1 | 5/2013 | Parker |
| 2013/0163429 | A1 | 6/2013 | Dunstan et al. |
| 2013/0188489 | A1 | 7/2013 | Sato |
| 2013/0223219 | A1 | 8/2013 | Mir et al. |
| 2013/0275583 | A1* | 10/2013 | Roach ................... H04L 43/08 709/224 |
| 2013/0301415 | A1* | 11/2013 | Archer ................. H04W 28/08 370/235 |
| 2014/0192646 | A1 | 7/2014 | Mir et al. |
| 2014/0376380 | A1* | 12/2014 | Campbell ............... H04L 47/10 370/236 |
| 2015/0036486 | A1 | 2/2015 | McMurry et al. |
| 2015/0036505 | A1 | 2/2015 | Sparks et al. |
| 2015/0085663 | A1 | 3/2015 | McMurry et al. |
| 2015/0230123 | A1* | 8/2015 | Kotecha ............... H04W 48/17 370/235 |
| 2016/0285759 | A1* | 9/2016 | Ryan .................... H04L 45/74 |
| 2016/0294991 | A1* | 10/2016 | Guo .................... H04L 65/1006 |
| 2016/0316022 | A1* | 10/2016 | Takano ................ H04L 67/141 |

FOREIGN PATENT DOCUMENTS

| | | |
|---|---|---|
| CN | 101588606 A | 11/2009 |
| CN | 102893556 B | 8/2016 |
| CN | 104335539 B | 7/2017 |
| EP | 1 314 324 B1 | 8/2008 |
| EP | 2 280 520 A1 | 2/2011 |
| EP | 1 847 076 B1 | 2/2012 |
| EP | 2 534 790 B1 | 4/2016 |
| IL | 221424 | 7/2016 |
| JP | 2006-100873 | 4/2006 |
| JP | 2011/166737 A | 8/2011 |
| JP | 6059336 | 1/2017 |
| KR | 10-2009-0029348 | 3/2009 |
| WO | WO 2004/064442 A1 | 7/2004 |
| WO | WO 2008/087633 A2 | 7/2008 |
| WO | WO 2009/070179 A1 | 6/2009 |
| WO | WO 2009/129487 A21 | 10/2009 |
| WO | WO 2011/100594 A2 | 8/2011 |
| WO | WO 2011/161575 A1 | 12/2011 |
| WO | WO 2012/056816 A1 | 5/2012 |
| WO | WO 2012/119147 A1 | 9/2012 |
| WO | WO 2012/130264 A1 | 10/2012 |
| WO | WO 2015/017422 A1 | 2/2015 |
| WO | WO 2013/155535 A1 | 3/2015 |
| WO | WO 2015/041750 A1 | 3/2015 |

OTHER PUBLICATIONS

Letter regarding Office Action for Japanese Patent Application No. 2015-505985 (dated Sep. 6, 2016).
Letter Regarding Office Action for Japanese Patent Application No. 2015-558193 (dated Aug. 30, 2016).
Letter Regarding Office Action for Japanese Patent Application No. 2015-558191 (dated Aug. 30, 2016).
Final Office Action for U.S. Appl. No. 13/863,351 (dated Aug. 26, 2016).
Notice of Allowance and Fee(s) Due and Examiner-Initiated Interview Summary for U.S. Appl. No. 14/034,478 (dated Aug. 25, 2016).
Notice of Allowance and Fee(s) Due, Applicant-Initiated Interview Summary, and AFCP 2.0 Decision for U.S. Appl. No. 13/749,655 (dated Aug. 22, 2016).
Communication of European publication number and information on the application of Article 67(3) EPC for European Patent Application No. 14755210.3 (dated Jul. 6, 2016).
Final Office Action for U.S. Appl. No. 13/915,281 (dated Jun. 13, 2016).
Business Communication, Kabushikikaisha Business-Communication-sha (Japan), vol. 49, No. 11, pp. 60-61 (Nov. 1, 2012).
Letter regarding Decision to Grant for Chinese Application No. ZL201180013555.4 (Apr. 21, 2016).

(56) References Cited

OTHER PUBLICATIONS

Decision to grant a European patent pursuant to Article 97(1) EPC for European Application No. 11742901.9 (Apr. 1, 2016).
Notification of the Fourth Office Action for Chinese Application No. 201180013555.4 (dated Mar. 2, 2016).
Communication under Rule 71(3) EPC for European Application No. 11 742 901.9 (Oct. 29, 2015).
Notification of the Third Office Action for Chinese Application No. 201180013555.4 (dated Sep. 21, 2015).
Letter regarding Office Action for Israel Patent Application No. 221424 (dated Aug. 11, 2015).
Second Office Action for Chinese Patent Application No. 201180013555.4 (dated Mar. 20, 2015).
Letter regarding Notice Before Examination for Israel Patent Application No. 221424 (Jan. 11, 2015).
First Office Action for Chinese Patent Application No. 201180013555.4 (dated Jul. 3, 2014).
Notice of Allowance and Fee(s) Due for U.S. Appl. No. 13/026,031 (dated May 30, 2013).
Supplemental Notice of Allowability for U.S. Appl. No. 13/026,031 (dated Mar. 22, 2013).
Notice of Allowance and Fee(s) Due for U.S. Appl. No. 13/026,031 (dated Jan. 30, 2013).
Notification of Transmittal of the International Search Report and the Written Opinion of the International Searching Authority, or the Declaration for International Application No. PCT/US2011/024601 (dated Oct. 20, 2011).
Traffix Systems, "Datasheet; Traffix Signaling Delivery Controller (SDC)," pp. 1-5 (May 2011).
Znaty, "Diameter, GPRS, (LTE + ePC = EPS), IMS, PCC and SDM," EFORT (May 2010). (Part 1 of 2, pp. 1-229).
Znaty, "Diameter, GPRS, (LTE + ePC = EPS), IMS, PCC and SDM," EFORT (May 2010). (Part 2 of 2, pp. 230-460).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Applicant-Initiated Interview Summary for U.S. Appl. No. 14/313,610 (dated Apr. 26, 2016).
Non-Final Office Action for U.S. Appl. No. 14/034,478 (dated Apr. 5, 2016).
Non-Final Office Action for U.S. Appl. No. 13/863,351 (dated Mar. 17, 2016).
Notice of Allowance and Fee(s) Due for U.S. Appl. No. 13/956,304 (dated Mar. 16, 2016).
Notice of Allowance and Fee(s) Due and Examiner-Initiated Interview Summary for U.S. Appl. No. 13/956,307 (dated Feb. 12, 2016).
Applicant-Initiated Interview Summary for U.S. Appl. No. 13/956,304 (dated Feb. 1, 2016).
Non-Final Office Action for U.S. Appl. No. 14/313,610 (dated Jan. 11, 2016).
Extended European Search Report for European Application No. 13776083.1 (dated Dec. 14, 2015).
Supplemental Notice of Allowability for U.S. Appl. No. 13/956,300 (dated Dec. 1, 2015).
Advisory Action for U.S. Appl. No. 13/863,351 (dated Nov. 25, 2015).
Advisory Action for U.S. Appl. No. 14/034,478 (dated Nov. 17, 2015).
Final Office Action for U.S. Appl. No. 13/956,307 (dated Nov. 5, 2015).
Final Office Action for U.S. Appl. No. 13/956,304 (dated Nov. 3, 2015).
Notice of Allowance and Fee(s) Due & Examiner-Initiated Interview Summary for U.S. Appl. No. 13/956,300 (dated Oct. 23, 2015).
Final Office Action for U.S. Appl. No. 13/863,351 (dated Sep. 11, 2015).
Final Office Action for U.S. Appl. No. 14/034,478 (dated Sep. 8, 2015).
Applicant-Initiated Interview Summary for U.S. Appl. No. 13/956,304 (Aug. 5, 2015).
Applicant-Initiated Interview Summary for U.S. Appl. No. 13/956,300 (Jun. 29, 2015).
Non-Final Office Action for U.S. Appl. No. 13/956,304 (dated May 4, 2015).
Non-Final Office Action for U.S. Appl. No. 13/956,307 (dated Apr. 23, 2015).
Non-Final Office Action for U.S. Appl. No. 13/956,300 (dated Apr. 8, 2015).
Notice of Allowance and Fee(s) Due and Examiner-Initiated Interview Summary for U.S. Appl. No. 13/572,156 (dated Apr. 6, 2015).
Non-Final Office Action for U.S. Appl. No. 13/863,351 (dated Mar. 27, 2015).
Non-Final Office Action for U.S. Appl. No. 14/034,478 (dated Mar. 23, 2015).
Communication of European publication number and information on the application of Article 67(3) EPC for European Application No. 13776083.1 (dated Jan. 21, 2015).
Final Office Action for U.S. Appl. No. 13/572,156 (dated Dec. 29, 2014).
Notification of Transmittal of the International Search Report and the Written Opinion for of the International Searching Authority, or the Declaration for International Application No. PCT/US2014/048651 (dated Nov. 17, 2014).
Notification of Transmittal of the International Search Report and the Written Opinion of the International Searching Authority, or the Declaration for International Application No. PCT/US2014/048644 (dated Oct. 17, 2014).
Non-Final Office Action for U.S. Appl. No. 13/572,156 (dated May 23, 2014).
Tschofenig, "Diameter Overload Architecture and Information Model," draft-tschofenig-dime-overload-arch-00.txt, Dime, pp. 1-9 (Jul. 16, 2013).
Notification of Transmittal of the International Search Report and the Written Opinion of the International Searching Authority, or the Declaration for International Application No. PCT/US2013/036664 (dated Jul. 2, 2013).

(56) References Cited

OTHER PUBLICATIONS

Campbell, "Diameter Overload Control Solution Issues," draft-campbell-dime-overload-issues-00, pp. 1-16 (Jun. 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Roach et al., "A Mechanism for Diameter Overload Control," draft-roach-dime-overload-ctrl-03, Dime, pp. 1-49 (May 17, 2013).
"Multi-Protocol Routing Agent User Guide," Policy Management, 910-6648-001 Revision A, pp. 1-70 (Mar. 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Fajardo et al., "Diameter Base Protocol," RFC 6733, pp. 1-152 (Oct. 2012).
McMurry et al., "Diameter Overload Control Requirements," draft-ietf-dime-overload-reqs-00, pp. 1-25 (Sep. 21, 2012).
"Multi-Protocol Routing Agent User Guide," Policy Management, 910-6404-001 Revision A, pp. 1-70 (Jun. 2012).
"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).
Interview Summary for U.S. Appl. No. 12/425,998 (dated Sep. 14, 2011).
Final Office Action for U.S. Appl. No. 12/425,998 (dated Jun. 8, 2011).
Interview Summary for U.S. Appl. No. 12/425,998 (dated Mar. 1, 2011).
Non-Final Office Action for U.S. Appl. No. 12/425,998 (dated Nov. 29, 2010).
Notification of Transmittal of the International Search Report and the Written Opinion of the International Searching Authority, or the Declaration for International Application No. PCT/US2009/041006 (Dec. 4, 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Hilt et al., "Session Initiation Protocol (SIP) Overload Control," IETF, draft-hilt-sipping-overload-02, p. 1-28 (Jul. 8, 2007).
Zhang et al., "Denial of Service Attack and Prevention on SIP VoIP Infrastructures Using DNS Flooding," in Principles, Systems, and Applications of IP Telecummunications (IPTCOMM) (Jul. 2007).
Nahum et al., "Evaluating SIP Server Performance," IBM T.J. Watson Research Center, RC24183 (Feb. 2007).
Rosenberg, "Requirements for Management of Overload in the Session Initiation Protocol," IETF, draft-rosenbergy-sipping-overload-reqs-02, p. 1-22 (Oct. 2006).
Kuthan et al., "Denial of Service Attacks Targeting a SIP VoIP Infrastructure: Attack Scenarios and Prevention mechanisms," IEEE Networks Magazine, vol. 20, No. 5 (Sep. 2006).
Ohta, "Overload Protection in a SIP Signaling Network," in International conference on Internet Surveillance and Protection (ICISP), p. 1-6 (2006).
Donovan et al., "Session Timers in the Session Initiation Protocol (SIP)," Network Working Group, RFC 4028 (Apr. 2005).
Ohta, "Simulation Study of SIP Signaling in an Overload Condition," International Conference for Communications, Internet, and Information Technology, IASTED/ACTA Press, pp. 321-326 (Nov. 22-24, 2004).
Calhoun et al., "Diameter Base Protocol," RFC 3588, pp. 1-147 (Sep. 2003).
Rosenberg et al., "SIP: Session Initiation Protocol," Network Working Group, RFC 3261, http://www.ietf.org/rfc/rfc3261.txt, p. 1-252 (Jun. 2002).
Schulzrinne et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser et al., "On the Relevance of Long-Range Dependence in Network Traffic," IEEE/ACM Transactions on Networking, vol. 7, No. 5, p. 629-640 (Oct. 1999).
Applicant-Initiated Interview Summary for U.S. Appl. No. 13/863,351 (May 27, 2016).
Notice of Allowance and Fee(s) Due for U.S. Appl. No. 14/313,610 (dated May 20, 2016).
Communication of European Publication Number and Information on the Application of Article 67(3) EPC for European Patent Application No. 14755208.7 (May 11, 2016).
Letter Regarding Notice of Grant for Japanese Patent Application No. 2016-531821 (Feb. 6, 2018).
Letter Regarding Japanese Office Action for Japanese Patent Application No. 2016-531821 (dated Jun. 6, 2017).
Letter Regarding Decision to Grant Chinese Patent Application No. ZL201380027543.6 (May 3, 2017).
Notice of Allowance and Fee(s) Due for U.S. Appl. No. 13/863,351 (dated Apr. 20, 2017).
Letter regarding notice of grant for Japanese Patent Application No. 2015/505985 (dated Nov. 29, 2016).
Applicant-Initiated Interview Summary for U.S. Appl. No. 13/863,351 (Nov. 9, 2016).
Notification of the First Office Action for Chinese Patent Application No. 201380027543.6 (Sep. 30, 2016).
Nakahira, "Applications for Software Defined Network Technologies on Edge Networks in the Future Network," IEICE Technical Report, vol. 112, No. 230, pp. 109-114 (Oct. 3, 2012).

* cited by examiner

METHODS, SYSTEMS, AND COMPUTER READABLE MEDIA FOR SHORT AND LONG TERM POLICY AND CHARGING RULES FUNCTION (PCRF) LOAD BALANCING

TECHNICAL FIELD

The subject matter described herein relates to load balancing traffic among PCRFs. More particularly, the subject matter described herein relates to methods, systems, and computer readable media for short and long term policy and charging rules function (PCRF) load balancing.

BACKGROUND

PCRFs are network nodes that perform policy and charging functions for the network. The PCRF function is invoked when another node establishes a policy and charging control session with the PCRF. For example, a Packet Data Network Gateway (PGW) or other node may establish a session with a PCRF to either obtain policy and charging instructions for sessions involving a given end user or to authorize and set up policy and charging rules associated with a service. A Diameter routing agent (DRA) assigns sessions to PCRFs and routes messages associated with a session to the PCRF to which the corresponding session has been assigned. Once a session is assigned to a PCRF, all traffic associated with that session is routed to the same PCRF until the session is terminated.

Network operators typically deploy multiple PCRFs in a network and load share the assignment of new sessions among the PCRFs. New sessions can be assigned to PCRFs utilizing a load balancing algorithm, such as a weighted round robin based algorithm. When assigning new sessions to PCRFs in a pool of PCRFs, it is desirable to weight the assignment based on the relative utilizations of the PCRFs. One possible metric for weighting the assignment of sessions to PCRFs is session utilization of the PCRFs. Session utilization refers to the number of sessions assigned to a PCRF relative to the maximum rated session capacity of a PCRF. For example, if there are four identically provisioned PCRFs in a network and the PCRFs are started at the same time, using session utilization as the sole load balancing metric, each new session would be assigned to one of the PCRFs until each PCRF reaches its maximum session capacity. Continuing with the example, assuming each of the PCRFs has the same maximum session capacity of 100 sessions, using a session utilization based weighted round robin load balancing, if PCRF #1 and #2 are each at 50% of their maximum session processing capacities and PCRFs #3 and #4 are each at 25% of their maximum session processing capacities, new sessions would be preferentially assigned to PCRFs #3 and #4 until the session utilizations of the PCRFs equalize. Once equalized, each PCRF may be selected in order to the PCRFs until maximum session capacities are reached. As sessions terminate, the session utilizations of the PCRFs are updated and the session assignments are weighted according to the relative session utilizations.

While using session utilization is a good metric for long term PCRF load balancing, such a metric does not take into account spikes in PCRF processor utilization by a given session and changes in relative PCRF processing capacity caused by tasks other than processing new sessions. For example, if one PCRF is running a background task, the processing capacity of that PCRF may be reduced compared to other PCRFs even though that PCRF has the same or even a lower number of sessions than the other PCRFs. Because session utilization does not consider the processing capacity of a PCRF and how it is affected by tasks other than new sessions, a PCRF with non-session based processing tasks that are operational may be over assigned a new session load.

In another example, if a given session assigned to a PCRF consumes a large amount of PCRF processing bandwidth relative to what is expected by the PCRF load balancing algorithm, the PCRF managing the session may become overloaded even though it is handling fewer sessions than other PCRFs. Again, using session utilization as the sole session assignment metric, the PCRF with the overactive session will be assigned the same and possibly even more new sessions than other less loaded PCRFs.

Accordingly, there exists a need for methods, systems, and computer readable media for short and long term PCRF load balancing

SUMMARY

The subject matter described herein includes methods, systems, and computer readable media for short and long term PCRF load balancing. A method for assigning new Diameter sessions to policy and charging rules functions (PCRFs) may be performed at a Diameter routing agent including at least one processor. The method includes receiving input regarding central processing unit (CPU) and session utilization of each of a plurality of PCRFs. The method further includes receiving Diameter message traffic requiring processing by one of the PCRFs. The method further includes identifying, from the Diameter message traffic, traffic for new sessions that have not been assigned to one of the PCRFs. The method further includes assigning the new sessions to the PCRFs based on the input regarding the CPU and session utilizations of the PCRFs. The method further includes routing the received Diameter message traffic for the new sessions to the PCRFs assigned to the new sessions.

The term "CPU utilization", as used herein refers to an indication of loading of processing capacity a PCRF for processing new and in-progress sessions. The CPU may be one or more physical processors of the PCRF, one or more physical processor cores of a physical processor of the PCRF, or one or more virtual processors of the PCRF. In one example, the CPU utilization is a moving average of the percentage loading of the CPU of a PCRF.

The term "session utilization" refers to an indication of the session load on a PCRF. The session utilization may be the number of sessions currently being handled by a PCRF divided by the maximum rated number of sessions that the PCRF is capable of handling (or a number less than the maximum rated number, for example to allow some margin of additional capacity in times heavy network traffic).

The phrase "input regarding CPU and session utilization" is intended to include load factors or CPU and session utilization values from which load factors can be computed.

A system for assigning new Diameter sessions to PCRFs includes a Diameter routing agent including at least one processor. The system further includes a load balancer associated with the Diameter routing agent for receiving input regarding central processing unit (CPU) and session utilization of each of a plurality of PCRFs. The system further includes a Diameter routing engine associated with the Diameter routing agent for receiving Diameter message traffic requiring processing by one of the PCRFs and identifying, from the Diameter message traffic, traffic for new sessions that have not been assigned to one of the PCRF. The load balancer assigns the sessions to the PCRFs based on the input regarding the CPU and session utilizations of the PCRFs and wherein the routing engine routes the received Diameter message traffic for the new sessions to the PCRFs assigned to the new sessions.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to load balancing Diameter message traffic among PCRFs. Rather than using session utilization as the sole metric for the relative loading of the PCRFs, a DRA as described herein utilizes a load factor that accounts for not only session utilization but also CPU utilization of the PCRFs. In addition, the relative contribution of CPU utilization to the load factor changes as the CPU utilization and session capacity change.

Figure 1A:
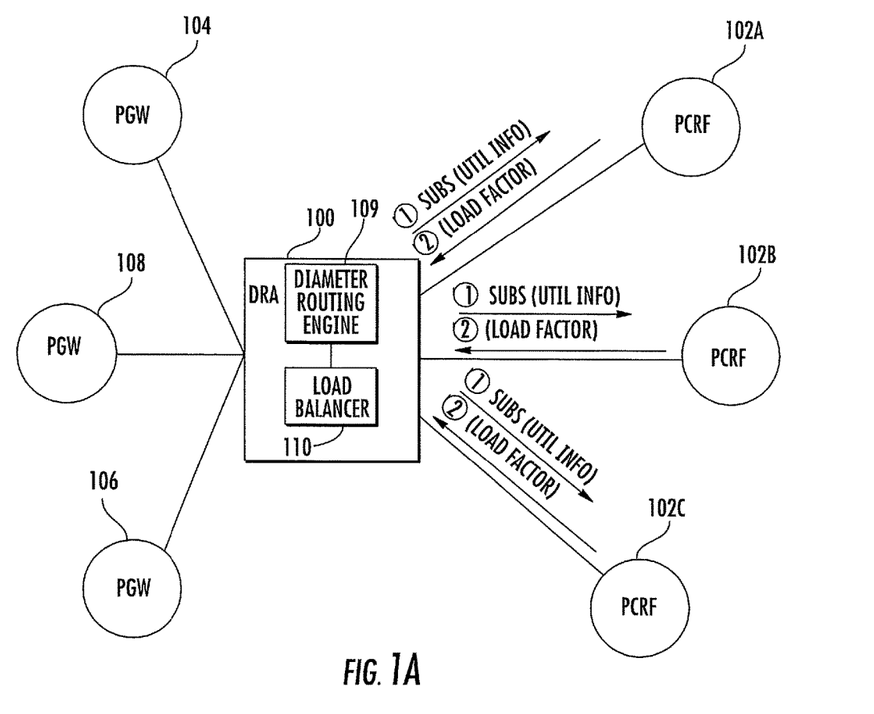
FIG. 1A is a network diagram illustrating a DRA subscribing to receive load factors from PCRFs according to an exemplary implementation of the subject matter described herein.

FIG. 1A is a network diagram illustrating a DRA and a plurality of PCRFs, where the DRA implements new session assignment among the PCRFs using a load factor that dynamically weights CPU utilization and session capacity according to an exemplary implementation of the subject matter described herein. Referring to FIG. 1A, DRA 100 routes policy traffic to a plurality of PCRFs 102A, 102B, and 102C, where the policy traffic originates from other nodes, such as PGWs 104 106, and 108. DRA 100 includes Diameter routing engine 109 and a load balancer 110. Diameter routing engine 109 receives Diameter signaling message traffic and identifies traffic for which sessions have been assigned to one of PCRFs 102A, 102B, and 102C and routes the Diameter message traffic to the PCRF to which the session has been assigned.

Diameter routing engine 109 also identifies traffic for which sessions have not been assigned to PCRFs 102A, 102B, and 102C. For such traffic, load balancer assigns the sessions PCRFs 102A, 102B, and 102C, and routing engine 109 routes the traffic to the assigned PCRF.

In FIG. 1A, load balancer 110 subscribes to receive load factors computed from CPU and session utilization information by each of PCRFs 102A, 102B, and 102C. In response to a successful subscription, each PCRF 102A, 102B, and 102C periodically publishes its load factor computed from its CPU and session utilization to load balancer 110.

In one exemplary implementation, as illustrated in FIG. 1A, each PCRF 102A, 102B, and 102C computes a load factor based on its CPU and session utilization and publishes the load factor to DRA 100. Load balancer 110 uses the load factors to compute PCRF selection frequencies for PCRFs 102A, 102B, and 102C. Load balancer 110 uses the PCRF selection frequencies to weight the assignment of new sessions to PCRFs 102A, 102B, and 102C. Exemplary algorithms for computing the load factor and the selection frequencies will be described in detail below.

Figure 1B:
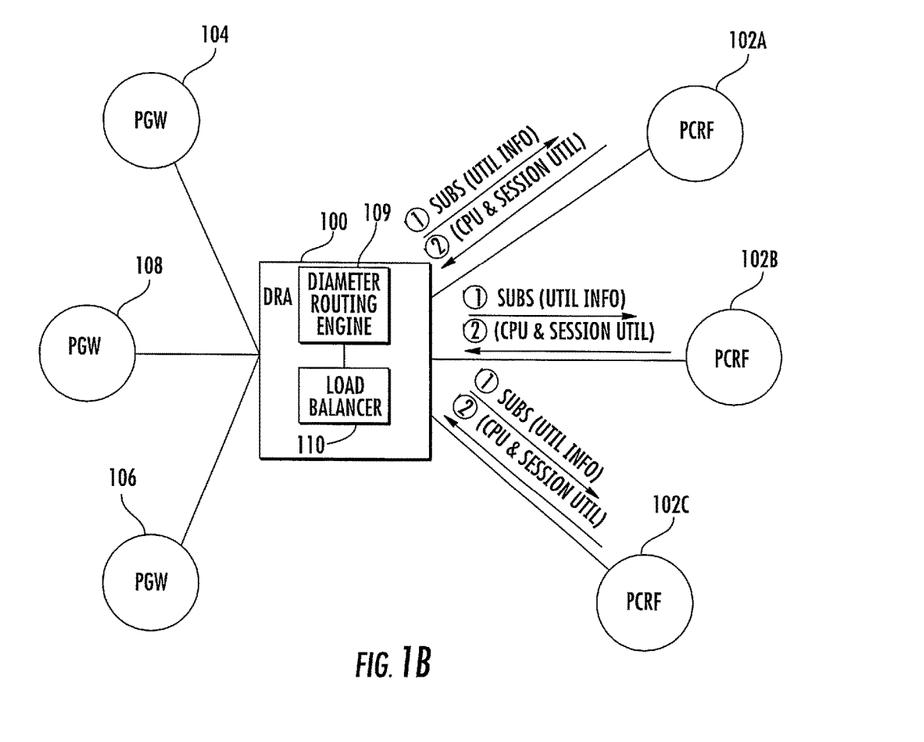
FIG. 1B is a network diagram illustrating a DRA subscribing to receive CPU and session utilization information from PCRFs according to an exemplary implementation of the subject matter described herein.

In FIG. 1A, each PCRF 102A, 102B, and 102C computes the load factor and publishes the load factor to subscribing DRA 100. In an alternate implementation illustrated in FIG. 1B, each PCRF 102A, 102B, and 102C may publish its CPU and session utilization to DRA 100, and load balancer 110 may compute the load factors and the selection frequencies. Thus, computing the load factor may be performed by DRA 100 or by PCRFs 102A, 102B, and 102C without departing from the scope of the subject matter described herein. In yet another alternate implementation, PCRFs 102A, 102B, and 102C may publish their CPU and session utilizations to DRA 100, and DRA 100 may compute selection frequencies for the PCRFs based on the CPU and session utilizations directly, i.e., without requiring computation of load factors.

Figure 2:
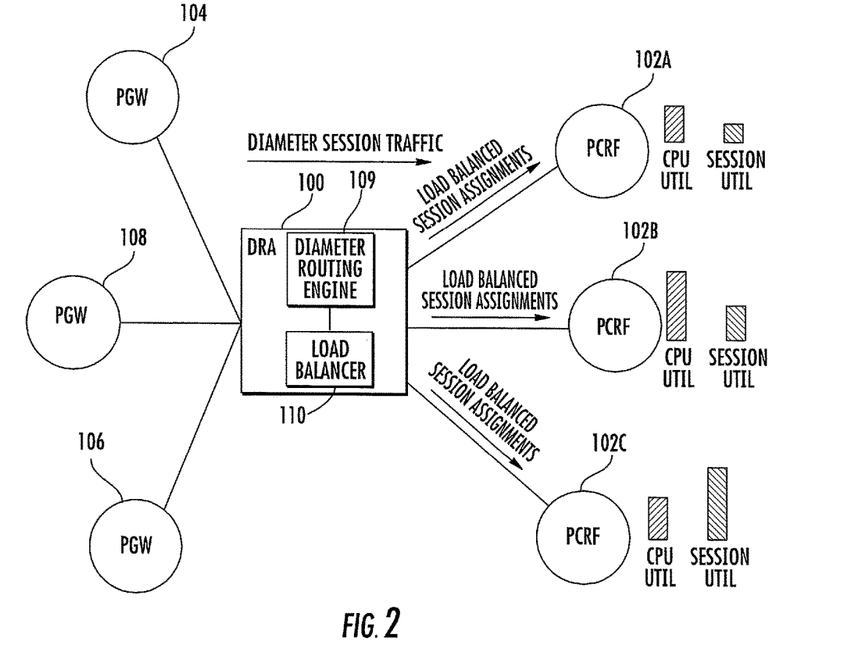
FIG. 2 is a network diagram illustrating the assignment of Diameter session traffic to PCRFs using CPU and session utilization of the PCRFs according to an exemplary implementation of the subject matter described herein.

FIG. 2 is a network diagram illustrating the result of load balancing by balancer 110. In FIG. 2, DRA 100 receives Diameter session traffic that requires processing by one of PCRFs 102A, 102B, and 102C. As stated above, each PCRF publishes not only its session utilization but also its CPU utilization (or load factor) to load balancer 110. As a result, load balancer 110 dynamically assigns new Diameter session traffic to the PCRFs using both CPU and session utilization where the relative contribution of CPU utilization to session utilization in the load factor dynamically changes as CPU utilization and session utilization change. An exemplary algorithm for utilizing both metrics and computing a load factor based on both metrics will now be described.

In FIG. 2, DRA 100 outputs Diameter traffic to PCRFs 102A, 102B, and 102C, where Diameter sessions are assigned to the PCRFs based on CPU utilization and session utilization, which should result in load balanced processing among PCRFs 102A, 102B, and 102C. Such a method is believed to be superior over using a single parameter to load balance the sessions among PCRFs 102A, 102B, and 102C. For example, using session utilization as part of the load balancing metric achieves long term balance of loading of PCRFs 102A, 102B, and 102C. CPU utilization is more of a short term metric of PCRF utilization and helps to account for spikes in processing activity of PCRFs 102A, 102B, and 102C. Using CPU utilization in combination with session utilization to assign new session traffic to PCRFs 102A, 102B, and 102C therefore achieves both short and long term load balancing of the processing load among PCRFs 102A, 102B, and 102C.

In one example, if PCRF 102B has a spike in CPU utilization, for example, caused by an overactive session or a background task, load balancer 110 will not automatically assign more new sessions to PCRF 102B than PCRF 102C just because PCRF 102B has a lower session utilization than PCRF 102C. Instead, load balancer 110, by considering both CPU and session utilization of PCRFs 102A, 102B, and 102C, will account for the background task or overactive session in making new session assignment decisions.

Prior to the subject matter described herein, the load balancing algorithm used by DRA 100 to assign traffic for new sessions to PCRFs was based solely on the PCRFs' session utilization levels. Under such a load balancing scheme, the more sessions a PCRF has relative to its maximum session capacity, the less it will be selected by DRA 100 for handling new sessions or subscriber attachments. Assigning a session to a PCRF has future traffic implications as the session goes through the different stages of establishment, updates and termination. As such, using the current session utilization level alone in the load balancing algorithm is a sensible long term load balancing strategy as it will work towards evening out the session distribution and as such associated traffic. This approach works very well when the load on the system is mainly coming from expected traffic associated with active sessions. However, it does not handle unexpected load due to unexpected traffic patterns and internal tasks (expected or not) running on a PCRF. The sections below describe an exemplary load balancing framework to take into account, in addition to session utilization, other load factors.

One implementation described herein improves PCRF load balancing by utilizing a load factor that considers not only the session utilization, but also the CPU utilization of the PCRFs, which are the servers performing the ultimate work and to which load is balanced, and DRA 100, which is the load balancer.

Load Factor

A PCRF may summarize its load level by publishing a "load factor" value to its DRA 100. One possible load factor includes relates only to session utilization. Such a load factor provided by the PCRF may be a normalized floating point value between 0 and 1, computed by default as follows:

$$\text{loadFactor}=(\text{numberOfSessions})/(\text{maxRatedSessionCapacity}) \quad (1)$$

The PCRF only takes the session utilization level into account when computing the load factor provided to DRA 100. Although this works well as a long term load balancing strategy, it doesn't take into account load from unexpected traffic patterns or internal tasks running on the PCRF.

As such, we analyzed several potential inputs that could be used to improve the load factor computation so it reflects different types of load. Below are the inputs that were analyzed:

Session utilization (all protocols)
CPU %
TPS (transactions per second)
Latency (%)
Queue size (%)
Overload status We analyzed each input as follows:

Session utilization is a very good predictor of future work as typically, work assigned to a node is proportional to the number of active sessions it is handling. This is an input that we will maintain.

CPU utilization is a good indicator of the current processing load to which a node is subjected. CPU utilization reflects the current load regardless of the load source. Unlike session utilization, CPU utilization can fluctuate rapidly and as such, we're more interested in its trend as opposed to instantaneous values. To this extent, we will use a moving average value based on 5 intervals, each of length 1 second. Thus, in one exemplary implementation, the CPU utilization value used to compute the load factor may be a moving average of n CPU utilization values of a given PCRF intervals, where n is an integer configurable by the user. Increasing n decreases the effect of spikes in CPU utilization on the load factor but decreases variability in PCRF selection.

We decided to not take TPS into account in the load factor computation for the following reasons:

Transactions vary widely and as such, the same TPS value with different traffic mixes could result in vastly different work load.

The system can be loaded when TPS utilization is low (e.g. due to internal tasks).

CPU already accounts for load resulting from transactions.

Even though TPS utilization is not used in the algorithm described below, the use of TPS to compute the load factor is intended to be within the scope of the subject matter described herein.

We decided to discard latency and queue size as well as they both tend to be low when the system is keeping up even when the system is at different load levels and then when the system is falling behind, they tend to jump to very high values. Their behavior is quite binary, and as such, they're not very useful to determine the load level of a node before it's busy. Even though latency and queue size are not used in the algorithms described below, using either or both to compute the load factor is intended to be within the scope of the subject matter described herein.

Finally, the overload status is a piece of information that is useful for a load balancer (DRA 100) to get, but not as part of the load factor; instead, publishing overload status separately would be useful so DRA 100 knows when an PCRF enters and exists an overload period. The overload state of a PCRF may be used as input to DRA 100 for load balancing. For example, if DRA is informed that a given PCRF is in an overloaded state, the overloaded PCRF may be removed from the load balancing pool or have its selection frequency decreased until the overload state is cleared.

So, in one implementation, the load factor computed by the PCRF will be a function of the session utilization percentage and a CPU utilization moving average. This function needs to take into account short term load as well as long term load. As a general guideline, as long as the node is able to handle the current processing load without impacting the level of service (i.e. throughput and latency), the session utilization level needs to be the dominant factor as it's going to impact future work load. However, if the processing load level is high enough to potentially impact the level of service provided by the node, it needs to be reflected in the load factor to prevent as much as possible impact to the service.

Similarly, when the session utilization levels are low, its contribution to the load factor should be proportionally less than when it's high.

In summary, the function may satisfy the following:
  When CPU utilization is low, its contribution to the load factor should be negligible.
  When the CPU utilization is high, its contribution needs to increase as the CPU utilization reaches its maximum potential value.
  The contribution of the session utilization level needs to be higher proportionally as the level grows.

Note regarding the CPU: in one exemplary implementation, PCRFs are implemented using PCRF processor blades, and the processors on the PCRF blades are configured for hyper-threading, which means that for each physical processor core, the operating system addresses two logical cores. CPU utilization is relative to the logical cores seen by the operating system (OS). In practice, the effective maximum CPU utilization with hyper threading on is about 70-80%. As such, we will be adjusting the CPU scale based on a maximum of 80% as opposed to 100%.

Based on the above criteria, we crafted a matrix (see Table 1 below) with the session utilization level in one dimension and the CPU utilization in the other dimension along with the load factor that seemed most appropriate for the different combinations as the value.

TABLE 1

Load Factors for Different Session and CPU Utilization Combinations

| sess/cpu (target) | 0 | 10 | 20 | 30 | 40 | 50 | 60 | 70 | 80 |
|---|---|---|---|---|---|---|---|---|---|
| 0 | 0 | 0 | 0 | 0.1 | 0.2 | 0.3 | 0.4 | 0.7 | 1 |
| 10 | 0.1 | 0.1 | 0.1 | 0.1 | 0.2 | 0.3 | 0.5 | 0.7 | 1 |
| 20 | 0.2 | 0.2 | 0.2 | 0.2 | 0.3 | 0.3 | 0.6 | 0.8 | 1 |
| 30 | 0.3 | 0.3 | 0.3 | 0.3 | 0.4 | 0.4 | 0.6 | 0.8 | 1 |
| 40 | 0.4 | 0.4 | 0.4 | 0.4 | 0.4 | 0.5 | 0.7 | 0.9 | 1 |
| 50 | 0.5 | 0.5 | 0.5 | 0.5 | 0.5 | 0.6 | 0.7 | 0.9 | 1 |
| 60 | 0.6 | 0.6 | 0.6 | 0.6 | 0.6 | 0.7 | 0.8 | 0.9 | 1 |
| 70 | 0.7 | 0.7 | 0.7 | 0.7 | 0.7 | 0.8 | 0.9 | 1 | 1 |
| 80 | 0.8 | 0.8 | 0.8 | 0.8 | 0.8 | 0.9 | 0.9 | 1 | 1 |
| 90 | 0.9 | 0.9 | 0.9 | 0.9 | 0.9 | 0.9 | 1 | 1 | 1 |
| 100 | 1 | 1 | 1 | 1 | 1 | 1 | 1 | 1 | 1 |

In Table 1, the values in the first column are session utilization values and the values in the first row are CPU utilization values. The remaining cells in Table 1 are load factors that are desired for the session/CPU utilization combinations.

We then came up with a function that satisfies the criteria we laid out and that resulted in a matrix with comparable values as the ones from the manually crafted matrix. The function is:

$$loadFactor = \min\left(sessUtil^{1.25} + \left(\frac{cpu}{80}\right)^3, 1\right) \quad (2)$$

where, sessUtil is the session utilization ratio (numberOfSessions/maxRatedSessionCapacity) and cpu is the moving average CPU utilization value. By using the cube of the normalized CPU utilization, CPU utilization values less than 30-40% are mostly negligible as per design, whereas when they get close to 80%, they become a major factor. The session utilization is also used at the power of 1.25 such that which will result in slightly less proportional contribution at low utilization (close to 0) versus high utilization (close to 100). Table 2 shown below illustrates load factors computing using Equation 2. In Table 2, the first column contains session utilization values and the first row contains CPU utilization values. The remaining cells in Table 2 are the load factors computed for each CPU/session utilization combination.

TABLE 2

Load Factors Computed using Equation 2

| sess/cpu (Equation 3) | 0 | 10 | 20 | 30 | 40 | 50 | 60 | 70 | 80 |
|---|---|---|---|---|---|---|---|---|---|
| 0 | 0.00 | 0.00 | 0.02 | 0.05 | 0.13 | 0.24 | 0.42 | 0.67 | 1.00 |
| 10 | 0.06 | 0.06 | 0.07 | 0.11 | 0.18 | 0.30 | 0.48 | 0.73 | 1.00 |
| 20 | 0.13 | 0.14 | 0.15 | 0.19 | 0.26 | 0.38 | 0.56 | 0.80 | 1.00 |
| 30 | 0.22 | 0.22 | 0.24 | 0.27 | 0.35 | 0.47 | 0.64 | 0.89 | 1.00 |
| 40 | 0.32 | 0.32 | 0.33 | 0.37 | 0.44 | 0.56 | 0.74 | 0.99 | 1.00 |
| 50 | 0.42 | 0.42 | 0.44 | 0.47 | 0.55 | 0.66 | 0.84 | 1.00 | 1.00 |
| 60 | 0.53 | 0.53 | 0.54 | 0.58 | 0.65 | 0.77 | 0.95 | 1.00 | 1.00 |
| 70 | 0.64 | 0.64 | 0.66 | 0.69 | 0.77 | 0.88 | 1.00 | 1.00 | 1.00 |
| 80 | 0.76 | 0.76 | 0.77 | 0.81 | 0.88 | 1.00 | 1.00 | 1.00 | 1.00 |
| 90 | 0.88 | 0.88 | 0.89 | 0.93 | 1.00 | 1.00 | 1.00 | 1.00 | 1.00 |
| 100 | 1.00 | 1.00 | 1.00 | 1.00 | 1.00 | 1.00 | 1.00 | 1.00 | 1.00 |

The equation for computing the load factor may change as the feature is tested and the equation is validated. Equation 3 shown below illustrates a more general equation for computing the load factor that includes parameters that can be optimized as further testing is performed.

$$loadFactor = \min\left(a \times sessUtil^{sessExp} + b \times \left(\frac{cpu}{maxCpu}\right)^{cpuExp}, 1\right) \quad (3)$$

In Equation 3, loadFactor is the load factor for a given PCRF, sessUtil is equal to a number of sessions assigned to the PCRF divided by a maximum rated session capacity of the PCRF, sessExp a constant used to exponentially weight a contribution of session utilization to the load factor, CPU is a moving average of CPU utilization of the PCRF, maxCPU is a maximum rated CPU capacity for the PCRF, cpuExp is a constant used to exponentially weight a contribution of the moving average of the CPU utilization to the load factor, and a and b are constants used to linearly weight the contributions of session utilization and the moving average of the CPU utilization to the load factor.

Thus, using Equation 3, sessExp, b, maxCpu and cpuExp may be modified to the most optimal default value. As a starting point, the following values can be used: a=1, sessExp=1.25, b=1, maxCpu=80, cpuExp=3. However, the subject matter described herein is not limited to Equation 3 or these values for the exponent. Any equation that includes both session utilization and CPU utilization in weighting the assignment of new sessions for a PCRF is intended to be within the scope of the subject matter described herein.

The PCRF's load factor may be added to a key performance indicator (KPI) statistic to assist debugging. For example, it may be desirable to test the load balancing algorithm used by load balancer 110 to assign new sessions to PCRFs 102A, 102B, and 102C. In performing such a test, a given set of constants may be assigned to the load factor and PCRFs 102A, 102B, and 102C may compute load factors using Equation 3. A test may be established where DRA 100 subscribes to receive load factors from PCRFs 102A, 102B, and 102C. Test traffic may then be transmitted to DRA 100 for assignment to PCRFs 102A, 102B, and 102C. A test module located on DRA 100 or a node external from DRA 100 may monitor the load factors of PCRFs 102A, 102B, and 102C and how the load factors change over time to evaluate the performance of the current session assignment algorithm. If the current equation for computing the load factor does not achieve balance loading among PCRFs 102A, 102B, and 102C, the constants used in Equation 3 may be changed and the test may be repeated until optimal load balancing is achieved.

In another example, when DRA 100 is using Equation 3 to load balance live traffic from PCRFs 102A, 102B, and 102C, load balancer 110 may monitor the load factors. If the current load factors do not achieve a desired balancing of CPU and/or session utilization among PCRFs 102A, 102B, and 102C, load balancer 110 may change one or more of the constants in Equation 3 to dynamically adjust the load balancing of live traffic. The adjustment may also be made manually by a network operator.

Load Balancing on the DRA

In one exemplary implementation, DRA 100 uses the load factor published by the PCRFs in its pool to compute the PCRF selection distribution. Equation 4 shown below may be used by DRAs to compute the PCRF selection frequency:

$$selectionFrequency = \left( \frac{\max(1, 10 - \lfloor PCRFLoadFactor \times 10 \rfloor)}{\sum_{i=1}^{n} (\max(1, 10 - \lfloor PCRFLoadFact_i \times 10 \rfloor))} \right), \quad (4)$$

where selectionFrequency is the selection frequency being computed, PCRFLoadFactor is the load factor for the PCRF for which the section frequency is being computed, n is the total number of PCRFs among or between which load is being balanced, and $PCRFLoadFactor_i$ is the load factor of the $i^{th}$ PCRF.

When the PCRFLoadFactor is multiplied by 10 in the Equation 4, only the integer part is kept (floor(PCRFLoadFactor*10)), and as such, the load factor is effectively rounded down to the nearest tenth decimal place. As an example, if the PCRF reports a load factor of 0.12, the floor(PCRFLoadFactor*10) for it using Equation 4 will be 1. A load factor of 0.26 when multiplied by 10 will be rounded down to 2.

Equation 5 shown below illustrates an exemplary formula for computing the PCRF selection frequency. In Equation 5, the PCRFLoadFactor's precision is enhanced over that of Equation 4 by multiplying by 100 (as opposed to 10) and using the corresponding integer part, effectively rounding down the load factor to the closest hundredth decimal place. As an example, a load factor of 0.12 will result in a PCRFLoadFactor*100 of 12. A load factor of 0.267 will result in a PCRFLoadFactor*100 of 26. This will allow DRA 100 to more evenly distribute load. Note that although more precision could be used, the difference in selection frequencies was negligible between using two decimal places versus three decimal places in the PCRFLoadFactor.

Also, DRA 100 currently ensures a minimum selection frequency for any given PCRF by selecting the max(1, 10-(PCRFLoadFactor*10)). This is to ensure a PCRF is never starved of new selections so long as it has not actually gone busy. This will be updated to max(5, 100-(PCRFLoadFactor*100)) to reduce the selection frequency of a loaded PCRF, but still ensure a minimum selection.

As such, the selection frequency formula at DRA 100 may be as follows:

$$selectionFrequency = \left( \frac{\max(5, 100 - \lfloor PCRFLoadFactor \times 100 \rfloor)}{\sum_{i=1}^{n} (\max(5, 100 - \lfloor PCRFLoadFact_i \times 100 \rfloor))} \right), \quad (5)$$

where selectionFrequency is the selection frequency, PCRFLoadFactor is the load factor the PCRF for which the selectionFrequency is being computed, $PCRFLoadFactor_i$ is the load factor for the $i^{th}$ PCRF, and n is the total number of PCRFs among or between which load is being balanced.

The following example illustrates the use of Equation 5 to compute selection frequencies and assign new sessions to PCRFs that DRA 100 has 6 PCRFs in its pool, with the following reported load factors and corresponding selection frequency:

TABLE 3

Load Factors and Selection Frequencies

| PCRF | PCRF's reported load factor | Selection Frequency |
|---|---|---|
| PCRF-1 | 0.32 | 15.96% |
| PCRF-2 | 0.27 | 17.14% |
| PCRF-3 | 0.4 | 14.08% |
| PCRF-4 | 0.18 | 19.25% |
| PCRF-5 | 0.35 | 15.26% |
| PCRF-6 | 0.22 | 18.31% |

In Table 3, the first column corresponds to each of PCRFs 1-6. The second column corresponds to the load factor reported by each PCRF (or computed by DRA 100 based on CPU and session utilization). The third column illustrates the corresponding selection frequency computed for the given PCRF using Equation 5. Load balancer 110 utilizes the computed selection frequencies to assign new sessions to PCRFs. For example, load balancer 110 may use a weighted round robin or other PCRF selection algorithm to assign new sessions to PCRFs where the weights for each PCRF correspond to the selection frequencies illustrated in Table 3. Under a weighted round robin approach, given the data in Table 3, PCFR-1 would be assigned the first 15.96% of a predetermined number of new sessions, PCRF-2 would be assigned the next 17.14% of new sessions, PCRF-3 would be assigned the next 14.08% of the new sessions, and so forth.

The subject matter described herein is not limited to using weighted round robin scheduling to assign new sessions to PCRFs. In an alternate implementation, DRA 100 may utilize a probability based scheduling algorithm where the selection frequencies are used as selection probabilities. For example, when load balancer 110 receives a message for a new session, such as a Diameter credit-control-request-initial (CCR-I) message, load balancer 110 may compute a pseudo-random number between 0 and 1. If the random number falls between 0 and 0.1596, the session may be assigned to PCRF-1, if the random number falls between 0.1596 (0.1596+0.1714) and 0.331, the session may be assigned to PCRF-2, and so forth.

Load balancer 110 may periodically recalculate the selection frequencies as new CPU and session utilization data is received from PCRFs 102A, 102B, and 102C. In one exemplary implementation, load balancer 110 may recalculate the selection frequencies at least one time per second.

Figure 3:
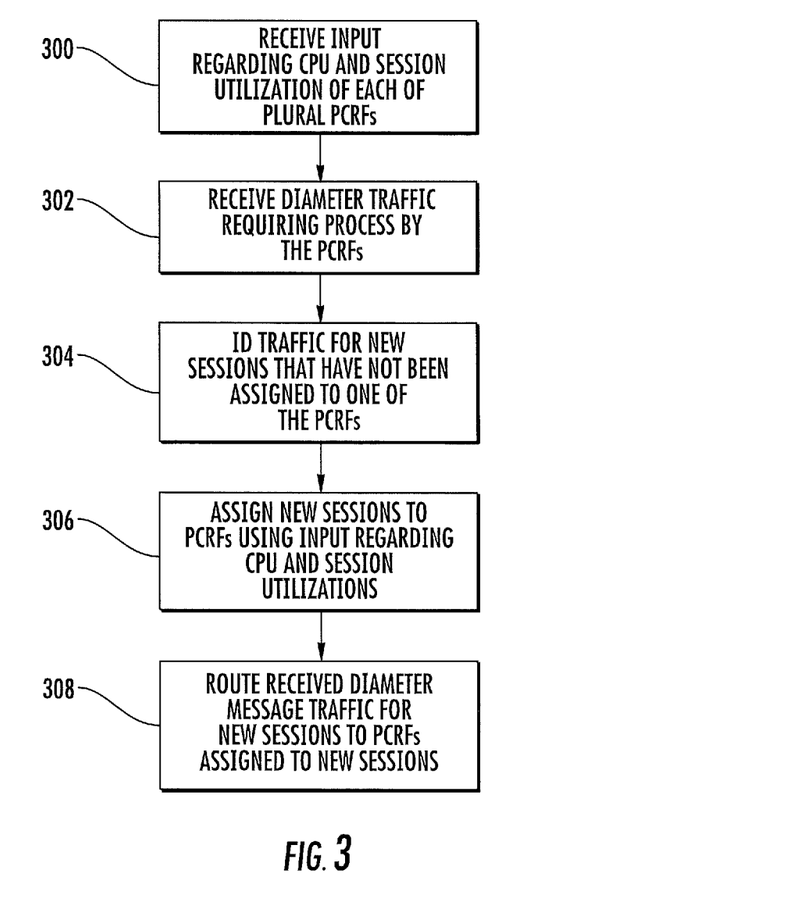
FIG. 3 is a flow chart illustrating an exemplary process for utilizing CPU and session utilization to assign sessions to PCRFs according to an exemplary implementation of the subject matter described herein.

FIG. 3 is a flow chart illustrating an exemplary process for load balancing Diameter session traffic among PCRFs according to an exemplary implementation of the subject matter described herein. Referring to FIG. 3, in step 300, a DRA receives input regarding session and CPU utilization of plural PCRFs. For example, as described above, DRA 100 may receive a load factor or other metric of CPU and session utilization from each of PCRFs 102A, 102B, and 102C in response to a subscription for that information. The CPU and session utilization information may be periodically received. Step 300 may preferably performed continually such that the session and CPU utilizations (or corresponding load factors) of the PCRFs are periodically updated.

In step 302, DRA 100 receives Diameter traffic requiring processing by the PCRFs. For example, DRA 100 may receive Diameter traffic from PGWs 104, 106, and 108 or other nodes. In step 304, DRA 100 identifies traffic for which a session has not been assigned to one of the PCRFs. For example, DRA 100 may maintain a session table that maps one or more parameters in a Diameter message to a session for sessions that have been assigned to a PCRF. If a received Diameter message does not have an assigned session in the session table, DRA 100 may determine that the session should be assigned to one of PCRFs using the load balancing algorithm described above. Accordingly, in step 306, assigns new sessions to the PCRFs using the input regarding the session and CPU utilizations. For example, DRA 100 may receive load factors or corresponding session and CPU utilization data from PCRFs 102A, 102B, and 102C. DRA 100 may compute the PCRF selection frequency for each PCRF using Equation 5 above. DRA 100 may then assign the new sessions to PCRFs 102A, 102B, and 102C using a weighted round robin selection or other weighted selection algorithm where the weights are the selection frequencies.

In step 308, DRA 308 routes the received Diameter message traffic for the new sessions to the PCRFs assigned to the new sessions. For example, once a PCRF is assigned to a session, DRA 100 adds an entry for that session to its session table. Routing engine 109 of DRA 100 may then use that entry to route session traffic the assigned PCRF. When DRA 100 receives future traffic for that session, routing engine 109 routes the traffic to the assigned PCRF by performing a lookup in the session table using information in received Diameter messages, locating the corresponding entry, and routing the messages to the PCRF identified by the entry. When a session terminates, DRA 100 may remove the corresponding entry from the session table.

Figure 4:
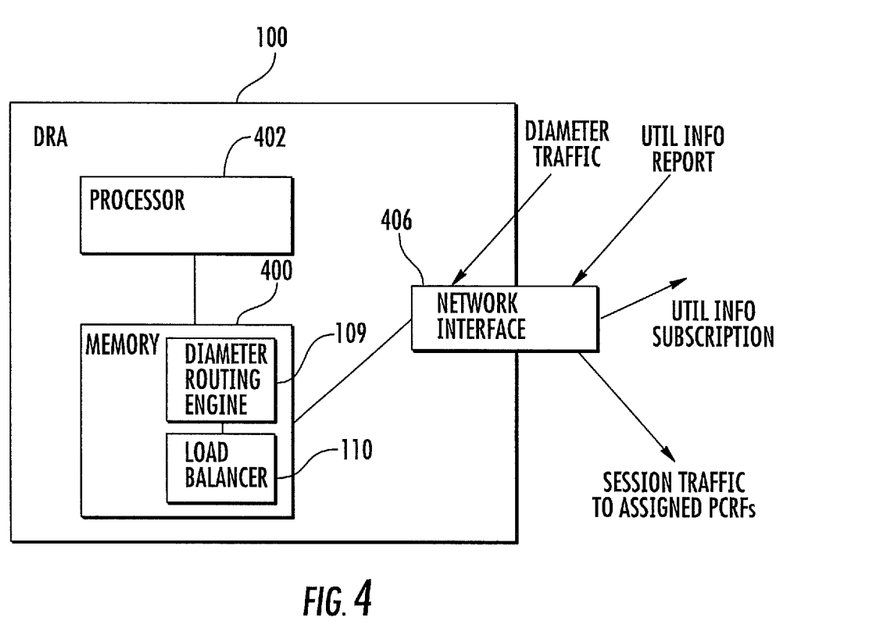
FIG. 4 is a block diagram of an exemplary architecture for a DRA with CPU and session utilization based load balancing of Diameter traffic among PCRFs according to an exemplary implementation of the subject matter described herein.

FIG. 4 is a block diagram illustrating exemplary components of a DRA according to an exemplary implementation of the subject matter described herein. In FIG. 4, DRA 100 includes at least one processor 400, a memory 402, and a network interface 406. Processor 400 may be a physical hardware processor including a single core or multiple cores. Processor 400 may also be a virtual processor that runs on a hypervisor layer that control access to underlying processor hardware. Memory 402 may be volatile or non-volatile memory that stores instructions executed by processor 400. As with processor 400, memory 402 may be a physical memory chip or virtualized memory that is mapped to one or more physical memory chips by a hypervisor layer. Network interface 406 may be a physical or virtual interface for sending packets to and receiving packets from a network.

In the illustrated example, memory 402 stores Diameter routing engine 109 and load balancer 110. As stated above, Diameter routing engine 109 receives Diameter messages, performs a lookup in the session table, and determines whether traffic corresponds to a session for which a PCRF has already been assigned. If a PCRF has already been assigned to a given session, Diameter routing engine 109 routes the traffic to the corresponding PCRF. For the traffic for which a session has not been assigned to a PCRF (i.e., new session traffic), load balancer 110 performs load balancing operations based on CPU and session utilization.

As described above, in one exemplary implementation, load balancer 110 may receive CPU and session utilization data from each PCRF and may compute load factors for the PCRFs. In another example, load balancer 110 may receive load factors computed by the PCRFs based on their respective CPU and session utilizations. Load balancer 110 may compute selection frequencies based on the load factors and load balance the new Diameter sessions among PCRFs using the selection frequencies. Network interface 406 receives CPU utilization and session information from the PCRFs and provides that information to load balancer 110. Network interface 406 may also receive new Diameter session traffic requiring PCRF assignment. Network interface 406 may assign the traffic to the PCRFs in a manner that results in both short and long term load balanced processing among the PCRFs.

It is understood that the architecture illustrated in FIG. 4 is simplified in that a DRA may include additional or alternative components without departing from the scope of the subject matter described herein. In one example, DRA 100 may be implemented on a processor blade in a rack mounted system. Multiple DRA processor blades may plug into a backplane to form a shelf. The DRA processor blades may themselves operate in a load balanced and redundant manner. In addition, a DRA may be a virtual DRA that runs on a hypervisor layer that shares access to underlying hardware, such as processor, memory, and network interfaces.

Figure 5:
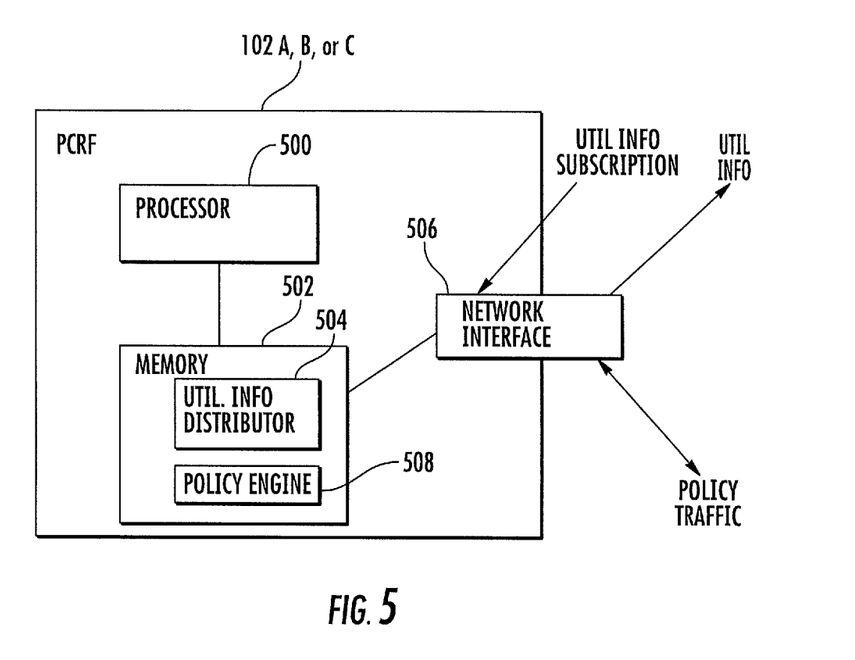
FIG. 5 is a block diagram illustrating a PCRF capable of reporting its CPU and session utilization to a Diameter routing agent according to an exemplary implementation of the subject matter described herein.

FIG. 5 is a block diagram illustrating an exemplary architecture for a PCRF according to an exemplary implementation of the subject matter described herein. Referring to FIG. 5, PCRF 102A, 102B, or 102C includes at least one processor 500, a memory 502, and a network interface 506. Processor 500, memory 502, and network interface 506 of PCRF 102A, 102B, or 102C may be structured similarly to processor 400, memory 402, and network interface 406 described above with respect to DRA 100. Hence, a description thereof will not be repeated herein. It should also be noted that PCRFs 102A, 102B, and 102C may have different processor and memory configurations and that PCRF load balancing as described herein load balances traffic among PCRFs 102A, 102B, and 102C even when the processing capacities of the PCRFs are different.

In the illustrated example, memory 502 includes a utilization information distributor 504 and a policy engine 508. Utilization information distributor 504 publishes CPU and session utilization information to subscribing entities, such as DRA 100. As indicated above, utilization information distributor 504 may distribute the actual CPU and session utilization values of a given PCRF or compute a load factor from the session and CPU utilization and publish the load factor. Network interface 506 receives utilization information subscriptions and policy traffic from the network. Utilization information distributor 504 manages subscriptions to utilization information and publishes the utilization information to subscribing entities, such as DRAs. Policy engine 508 processes policy traffic, accesses policy rules, and provides the policy rules to enforcement entities, such as PCEFs. Policy engine 508 may also provide rules for charging of Diameter sessions. As with DRA 100, each PCRF 102A, 102B, and 102C may be a virtual PCRF that runs on a hypervisor layer that controls access to underlying hardware.

Thus, PCRF load balancing as described herein functions on special purpose computing platforms, such as DRAs and PCRFs. The load balancing algorithms described herein improve the functionality of DRAs, PCRFs, and the core network in general by more evenly distributing processing loads among PCRFs, even when the PCRFs have different hardware and when processing utilizations varies due to variability among sessions and other processes executing on PCRFs. PCRF load balancing as described herein improves the technological field of processor assignment for policy and charging control. By more evenly distributing processing load among PCRFs, PCRF utilization efficiency is increased, and the likelihood of PCRF failure or overloading is decreased.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for assigning new Diameter sessions to policy and charging rules functions (PCRFs), the method comprising:
    at a Diameter routing agent including at least one processor:
        subscribing, by the Diameter routing agent, to receive input regarding central processing unit (CPU) and session utilization from a plurality of PCRFs;
        receiving, by the Diameter routing agent, the input regarding CPU and session utilization of each of the PCRFs, wherein the input regarding CPU utilization is a CPU utilization of each of the PCRFs wherein the input regarding session utilization is a number of sessions being handled by each of the PCRFs divided by a maximum rated session capacity of each of the PCRFs, and wherein each of the PCRFs periodically publishes the input regarding CPU and session utilization to successful subscribers;
        receiving Diameter message traffic requiring processing by one of the PCRFs;
        identifying, from the Diameter message traffic, traffic for new sessions that have not been assigned to one of the PCRFs;
        assigning the new sessions to the PCRFs based on the input regarding the CPU and session utilizations of the PCRFs, wherein assigning the new sessions to the PCRFs includes selecting one of the PCRFs from a pool of PCRFs using load factors computed for the PCRFs and wherein selecting one of the PCRFs includes computing a selection frequency for each of the PCRFs using the load factors; and
        routing the received Diameter message traffic for the new sessions to the PCRFs assigned to the new sessions.

2. The method of claim 1 comprising computing the load factors for the PCRFs, wherein each of the load factors weights CPU utilization relative to session utilization.

3. The method of claim 2 wherein receiving the input includes periodically receiving the input from the PCRFs and wherein computing the load factors includes periodically computing the load factors for the PCRFs.

4. The method of claim 2 wherein a relative contribution of the CPU utilization with respect to the session utilization to each of the load factors changes as the CPU utilization changes.

5. The method of claim 2 wherein the PCRFs compute the load factors.

6. The method of claim 2 wherein the Diameter routing agent computes the load factors.

7. The method of claim 1 wherein computing the selection frequency includes computing the selection frequency as follows:

$$selectionFrequency = \left( \frac{\max(5, 100 - \lfloor PCRFLoadFactor \times 100 \rfloor)}{\sum_{i=1}^{n} (\max(5, 100 - \lfloor PCRFLoadFact_i \times 100 \rfloor))} \right),$$

where selectionFrequency is the selection frequency, PCRFLoadFactor is the load factor of the PCRF for which the selection frequency is being computed, PCRFLoadFactor$_i$ is the load factor for the i$^{th}$ PCRF, and n is the number of PCRFs.

8. The method of claim 2 wherein computing the load factors includes computing the load factors as follows:

$$loadFactor = \min\left(a \times sessUtil^{sessExp} + b \times \left(\frac{cpu}{maxCpu}\right)^{cpuExp}, 1\right),$$

where loadFactor is the load factor for a given PCRF, sessUtil is equal to a number of sessions assigned to the PCRF divided by a maximum rated session capacity of the PCRF, sessExp a constant used to exponentially weight a contribution of session utilization to the load factor, CPU is a moving average of CPU utilization of the PCRF, maxCPU is a maximum rated CPU capacity for the PCRF, cpuExp is a constant used to exponentially weight a contribution of the moving average of the CPU utilization to the load factor, and a and b are constants used to linearly weight the contributions of session utilization and the moving average of the CPU utilization to the load factor.

9. A system for assigning new Diameter sessions to policy and charging rules functions (PCRFs), the system comprising:
    a Diameter routing agent including at least one processor and for subscribing to receive input regarding central processing unit (CPU) and session utilization from a plurality of PCRFs;

a load balancer implemented by the Diameter routing agent for receiving the input regarding CPU and session utilization of each of the PCRFs, wherein the input regarding CPU utilization is a CPU utilization of each of the PCRFs, wherein the input regarding session utilization is a number of sessions being handled by each of the PCRFs divided by a maximum rated session capacity of each of the PCRFs, and wherein each of the PCRFs periodically publishes the input regarding CPU and session utilization to successful subscribers;

a Diameter routing engine associated with the Diameter routing agent for receiving Diameter message traffic requiring processing by one of the PCRFs and identifying, from the Diameter message traffic, traffic for new sessions that have not been assigned to one of the PCRFs; and wherein the load balancer assigns the new sessions to the PCRFs based on the input regarding the CPU and session utilizations of the PCRFs, wherein assigning the new sessions to the PCRFs includes selecting one of the PCRFs from a pool of PCRFs using load factors computed for the PCRFs, wherein selecting one of the PCRFs includes computing a selection frequency for each of the PCRFs using the load factors, and wherein the routing engine routes the received Diameter message traffic for the new sessions to the PCRFs assigned to the new sessions.

10. The system of claim 9 wherein assigning the new sessions to the PCRFs includes computing the load factors for the PCRFs, wherein the load factors weight CPU utilization relative to session utilization.

11. The system of claim 10 wherein receiving the input includes periodically receiving the input from the PCRFs and wherein computing the load factors includes periodically computing the load factors for the PCRFs.

12. The system of claim 10 wherein a relative contribution of the CPU utilization with respect to the session utilization to each of the load factors changes as the CPU utilization changes.

13. The system of claim 10 wherein PCRFs compute the load factors.

14. The system of claim 10 wherein the load balancer computes the load factors.

15. The system of claim 10 wherein the load balancer is configured to compute the selection frequency for each of the PCRFs using the load factors.

16. The system of claim 15 wherein the load balancer is configured to compute the selection frequency as follows:

$$selectionFrequency = \left( \frac{\max(5, 100 - \lfloor PCRFLoadFactor \times 100 \rfloor)}{\sum_{i=1}^{n} (\max(5, 100 - \lfloor PCRFLoadFact_i \times 100 \rfloor))} \right),$$

where selectionFrequency is the selection frequency, PCRFLoadFactor is the load factor of the PCRF for which the selection frequency is being computed, PCRFLoadFactor$_i$ is the load factor for the i$^{th}$ PCRF, and n is the number of PCRFs.

17. The system of claim 10 wherein the load balancer is configured to compute the load factors as follows:

$$loadFactor = \min\left(a \times sessUtil^{sessExp} + b \times \left(\frac{cpu}{\max Cpu}\right)^{cpuExp}, 1\right)$$

where loadFactor is the load factor for a given PCRF, sessUtil is equal to a number of sessions assigned to the PCRF divided by a maximum rated session capacity of the PCRF, sessExp a constant used to exponentially weight a contribution of session utilization to the load factor, CPU is a moving average of CPU utilization of the PCRF, maxCPU is a maximum rated CPU capacity for the PCRF, cpuExp is a constant used to exponentially weight a contribution of the moving average of the CPU utilization to the load factor, and a and b are constants used to linearly weight the contributions of session utilization and the moving average of the CPU utilization to the load factor.

18. A non-transitory computer readable medium having stored thereon executable instructions that when executed by the processor of a computer control the computer to perform steps comprising:

subscribing, by the Diameter routing agent, to receive input regarding central processing unit (CPU) and session utilization from a plurality of policy and charging rules functions (PCRFs);

receiving, by the Diameter routing agent, the input regarding CPU and session utilization of each of the PCRFs;

receiving Diameter message traffic requiring processing by one of the PCRFs;

identifying, from the Diameter message traffic, traffic for new sessions that have not been assigned to one of the PCRFs;

assigning the new sessions to the PCRFs based on the input regarding the CPU and session utilizations of the PCRFs, wherein the input regarding CPU utilization is a CPU utilization of each of the PCRFs, wherein the input regarding session utilization is a number of sessions being handled by each of the PCRFs divided by a maximum rated session capacity of each of the PCRFs, wherein each of the PCRFs periodically publishes the input regarding CPU and session utilization to successful subscribers, wherein assigning the new sessions to the PCRFs includes selecting one of the PCRFs from a pool of PCRFs using load factors computed for the PCRFs, and wherein selecting one of the PCRFs includes computing a selection frequency for each of the PCRFs using the load factors; and routing the received Diameter message traffic for the new sessions to the PCRFs assigned to the new sessions.

* * * * *

UNITED STATES PATENT AND TRADEMARK OFFICE
CERTIFICATE OF CORRECTION

PATENT NO. : 10,027,760 B2
APPLICATION NO. : 14/720412
DATED : July 17, 2018
INVENTOR(S) : Renzullo et al.

Page 1 of 2

It is certified that error appears in the above-identified patent and that said Letters Patent is hereby corrected as shown below:

In the Specification

In Column 2, Line 17, delete "balancing" and insert -- balancing. --, therefor.

In Column 6, Line 3, delete "second)" and insert -- second) % --, therefor.

In Column 10, Line 66, delete "PCFR-1" and insert -- PCRF-1 --, therefor.

In the Claims

In Column 14, Line 33, in Claim 7, delete "$selectionFrequency = \left( \dfrac{\max(5, 100 - \lfloor PCRFLoadFactor \times 100 \rfloor)}{\sum_{i=1}^{n}(\max(5, 100 - \lfloor PCRFLoadFact_i \times 100 \rfloor))} \right)$" and insert -- $selectionFrequency = \left( \dfrac{\max(5, 100 - \lfloor PCRFLoadFactor \times 100 \rfloor)}{\sum_{i=1}^{n}(\max(5, 100 - \lfloor PCRFLoadFactor_i \times 100 \rfloor))} \right)$ --, therefor.

In Column 14, Line 46, in Claim 8, delete "$loadFactor = \min\left( a \times sessUtil^{sessExp} + b \times \left( \dfrac{cpu}{maxCpu} \right)^{cpuExp}, 1 \right)$" and insert -- $loadFactor = \min\left( a \times sessUtil^{sessExp} + b \times \left( \dfrac{cpu}{maxCPU} \right)^{cpuExp}, 1 \right)$ --, therefor.

In Column 15, Line 53, in Claim 16, delete "$selectionFrequency = \left( \dfrac{\max(5, 100 - \lfloor PCRFLoadFactor \times 100 \rfloor)}{\sum_{i=1}^{n}(\max(5, 100 - \lfloor PCRFLoadFact_i \times 100 \rfloor))} \right)$" and insert -- $selectionFrequency = \left( \dfrac{\max(5, 100 - \lfloor PCRFLoadFactor \times 100 \rfloor)}{\sum_{i=1}^{n}(\max(5, 100 - \lfloor PCRFLoadFactor_i \times 100 \rfloor))} \right)$ --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 10,027,760 B2

In Column 16, Line 8, in Claim 17, delete "$loadFactor = \min\left(a \times sessUtil^{sessExp} + b \times \left(\frac{cpu}{maxCpu}\right)^{cpuExp}, 1\right)$," and insert -- $loadFactor = \min\left(a \times sessUtil^{sessExp} + b \times \left(\frac{cpu}{maxCPU}\right)^{cpuExp}, 1\right)$ --, therefor.